(12) United States Patent
Keyser et al.

(10) Patent No.: US 7,008,967 B2
(45) Date of Patent: Mar. 7, 2006

(54) PRODUCTION OF SYNTHESIS GAS AND SYNTHESIS GAS DERIVED PRODUCTS

(75) Inventors: Martin Jakobus Keyser, Sasolburg (ZA); Margaretha Coertzen, Vanderbijlpark (ZA)

(73) Assignee: Sasol Technology (Proprietary) Limited, Rosebank Johannesburg (ZA)

( * ) Notice: Subject to any disclaimer, the term of this patent is extended or adjusted under 35 U.S.C. 154(b) by 0 days.

(21) Appl. No.: 10/533,096

(22) PCT Filed: Oct. 27, 2003

(86) PCT No.: PCT/IB03/04733

§ 371 (c)(1),
(2), (4) Date: Jul. 14, 2005

(87) PCT Pub. No.: WO2004/037717

PCT Pub. Date: May 6, 2004

(65) Prior Publication Data

US 2005/0261382 A1    Nov. 24, 2005

(30) Foreign Application Priority Data

Oct. 28, 2002  (ZA) .................................. 2002/8708

(51) Int. Cl.
*C07C 27/00* (2006.01)
*C07C 1/02* (2006.01)
*C01B 3/24* (2006.01)

(52) U.S. Cl. ...................... 518/702; 518/700; 518/703; 518/704; 518/705; 423/650

(58) Field of Classification Search .............. 518/702, 518/703, 704, 700, 705; 423/650; 252/373
See application file for complete search history.

(56) References Cited

U.S. PATENT DOCUMENTS

| 3,972,958 A |   | 8/1976 | Garwood et al. |
| 4,046,830 A |   | 9/1977 | Kuo |
| 4,199,327 A | * | 4/1980 | Hempill et al. ............... 48/202 |
| 4,252,736 A |   | 2/1981 | Haag et al. |
| 4,778,826 A |   | 10/1988 | Jezl et al. |

FOREIGN PATENT DOCUMENTS

| EP | 0 082 702 A1 | 6/1983 |
| EP | 0 693 539 A2 | 1/1996 |
| GB | 671490 | 5/1952 |

OTHER PUBLICATIONS

International Search Report, *4 Pages, Mailed Feb. 20, 2004*, International Application No. PCT/IB2003/004733.

* cited by examiner

*Primary Examiner*—J. Parsa
(74) *Attorney, Agent, or Firm*—Wood, Herron & Evans, L.L.P.

(57) ABSTRACT

A process (10) for producing synthesis gas includes, in a gasification stage (12), gasifying a carbonaceous feestock to provide a raw synthesis gas which includes at least $H_2$, CO and $CH_4$ and, in a partial oxidation stage (14), subjecting the raw synthesis gas to partial oxidation in the presence of oxygen to provide an upgraded synthesis gas which includes less $CH_4$ and more $H_2$ and CO than the raw synthesis gas. The invention extends to a process for producing a synthesis gas derived product.

14 Claims, 2 Drawing Sheets

PRODUCTION OF SYNTHESIS GAS AND SYNTHESIS GAS DERIVED PRODUCTS

THIS INVENTION relates to the production of synthesis gas and synthesis gas derived products. In particular, it relates to a process for producing synthesis gas and to a process for producing a synthesis gas derived product.

Gasifiers are used to gasify solid carbonaceous materials in order to generate synthesis gas. When some gasifiers, such as Lurgi (trade name) moving bed gasifiers are used to generate synthesis gas from coal, a significant amount of methane is produced and tar and solids are present in the raw synthesis gas produced by the gasifiers. In many processes, such as a Fischer-Tropsch synthesis gas conversion process, relying on a synthesis gas feedstock produced in gasifiers from solid carbonaceous material, the methane in the synthesis gas poses a problem, as it passes through the process inertly, effectively reducing equipment capacity. The tar and solids also pose a problem as, in order to get rid of them, the synthesis gas has first to be quenched. The effect of this is that the steam generation capacity of the synthesis gas is reduced as a result of the thermal energy lost during quenching, allowing low pressure steam only to be generated.

According to one aspect of the invention, there is provided a process for producing synthesis gas, the process including in a gasification stage, gasifying a carbonaceous feedstock to provide a raw synthesis gas which includes at least $H_2$, CO and $CH_4$; and in a partial oxidation stage, subjecting the raw synthesis gas to partial oxidation in the presence of oxygen to provide an upgraded synthesis gas which includes less $CH_4$ and more $H_2$ and CO than the raw synthesis gas.

The partial oxidation stage is typically a non-catalytic, thermal partial oxidation stage. Typically, when the carbonaceous feedstock is coal or the like, the raw synthesis gas includes tar and solids. Advantageously, by subjecting the raw synthesis gas to thermal partial oxidation, the upgraded synthesis gas which is produced is substantially free of heavier hydrocarbons (e.g. tars) and solids, as well as methane obviating the need to quench the raw synthesis gas with water to get rid of the tars and solids. The solids may be removed as a molten slag from the partial oxidation reactor.

The thermal partial oxidation may be effected at a temperature of between about 1000° C. and about 1600° C., more preferably between about 1100° C. and about 1400° C., e.g. about 1300° C. The operating temperature of the partial oxidation stage must be above the ash melting temperature.

The process may include subjecting the upgraded synthesis gas to a water-gas shift reaction stage to provide a hydrogen enriched synthesis gas with a more desirable molar ratio of $H_2$ and CO, e.g. a molar ratio of 1:1.7 or 1:2. Subjecting the steam at a temperature of at least 400° C., preferably between about 410° C. and about 450° C., to the upgraded synthesis gas.

The process may include, in a cooling stage, cooling the upgraded synthesis gas and producing steam. Steam at a pressure of at least 34 bar, preferably at least 41 bar, is produced in the cooling stage. This high pressure steam may advantageously be used in the gasification stage and/or in the water-gas shift reaction stage, obviating the need to generate or supply additional high pressure steam. Typically, in the cooling stage, condensed water is removed from the synthesis gas. The upgraded synthesis gas may be cooled to the operating temperature of said water-gas shift reaction stage, typically between 700° C. and 900° C.

The process may also include, in a cooling stage, cooling the hydrogen enriched synthesis gas and producing steam. The steam may be high pressure steam.

Typically, the carbonaceous feedstock is gasified in the presence of oxygen and steam in a gasifier, such as a Lurgi (trade name) moving bed gasifier.

The process may include, in a reforming stage, reforming of steam and a methane-containing feedstock. A product stream from the reforming stage may be combined with upgraded synthesis gas. The required energy for such a reforming reaction may be obtained from the high-temperature upgraded synthesis gas, that is, some of the energy that could be used to generate steam during a cooling step may then be used to supply energy to the reforming stage.

In a preferred embodiment of the process when a reforming stage is present, the reforming stage is thus a gas-heated reforming stage in which the upgraded synthesis gas is cooled whilst supplying energy to the reforming stage.

The process may thus include feeding a gaseous or liquid methane-containing feedstock to the reforming stage.

According to another aspect of the invention, there is provided a process for producing a synthesis gas derived product, which process includes producing a synthesis gas in a process as hereinbefore described; and in a synthesis gas conversion stage, converting the synthesis gas to a synthesis gas derived product.

In one embodiment of the invention, the synthesis gas conversion stage is a Fischer-Tropsch hydrocarbon synthesis stage. However, it is to be appreciated that the synthesis gas conversion stage may be any synthesis stage requiring synthesis gas, such as a methanol, higher alcohol or oxoalcohol synthesis stage.

The Fischer-Tropsch hydrocarbon synthesis stage may be provided with any bed reactor. The pressure in the reactor may be between 1 bar and 100 bar, while the temperature may be between 200° C. and 380° C. Preferably, the Fischer-Tropsch hydrocarbon synthesis stage is a high temperature Fischer-Tropsch hydrocarbon synthesis stage. The reactor will thus contain a Fischer-Tropsch catalyst, which will be in particulate form. The catalyst may contain, as its active catalyst component, Co, Fe, Ni, Ru, Re and/or Rh. The catalyst may be promoted with one or more promoters selected from an alkali metal, V, Cr, Pt, Pd, La, Re, Rh, Ru, Th, Mn, Cu, Mg, K, Na, Ca, Ba, Zn and Zr. The catalyst may be a supported catalyst, in which case the active catalyst component, e.g. Co, is supported on a suitable support such as $Al_2O_3$, $TiO_2$, $SiO_2$, ZnO or a combination of these.

The process may include removing sulphur compounds which may be present in the synthesis gas, prior to converting the synthesis gas to a synthesis gas derived product. Removing the sulphur compounds may include employing a so-called Rectisol process, in which methanol is used to wash the synthesis gas.

In the synthesis gas conversion stage, a product gas may be formed which includes $CH_4$. The $CH_4$ may be separated from the product gas. In one embodiment of the invention, the $CH_4$ is separated from one or more condensate streams in a cold separation stage. The separated $CH_4$ may be flared. Instead, the separated $CH_4$ may be recycled to the partial oxidation stage. One embodiment of the process of the invention may thus be characterised in that a reforming stage, e.g. a steam reforming stage, is not required downstream of the synthesis gas conversion stage, as the bulk of the methane formed during gasification of the carbonaceous material in this embodiment of the process, and optionally the bulk of the recycled methane, is oxidised in the partial oxidation stage.

In another embodiment of the process, in which a reforming stage is present, a product gas is formed in the synthesis gas conversion stage which includes $CH_4$, the process further including separating the $CH_4$ from the product gas and recycling the $CH_4$ to the reforming stage.

BRIEF DESCRIPTION OF DRAWINGS

The invention will now be described, by way of example, with reference to the

Referring to FIG. 1 of the drawings, reference numeral 10 generally indicates a process in accordance with the invention for producing a synthesis gas derived product.

Figure 1:
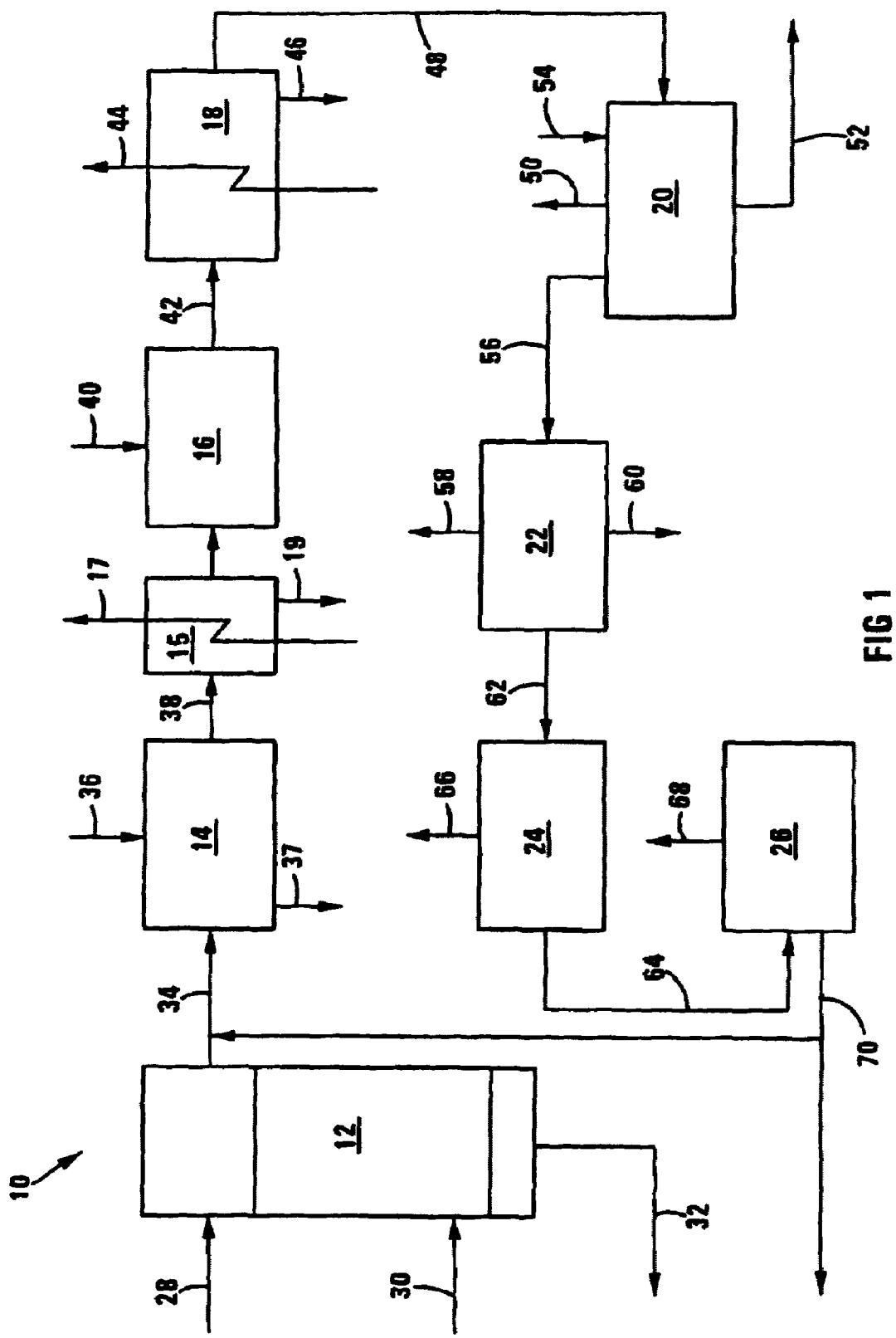
FIG. 1 shows an embodiment of a process in accordance with the invention for producing a synthesis gas derived product, the process including a process for producing synthesis gas.

The process 10, as shown by the simplified flow sheet in FIG. 1, includes a gasification stage 12, a partial oxidation stage 14, a first cooling stage 15, a water-gas shift reaction stage 16, a second cooling stage 18, a synthesis gas sweetening stage 20, a synthesis gas conversion stage 22, a $CO_2$ removal stage 24 and a cold separation stage 26.

A coal feedstock line 28 and a steam and oxygen feed line 30 lead into the gasification stage 12, with an ash removal line 32 being provided to remove ash from the gasification stage 12. A raw gas line 34 leads from the gasification stage 12 to the partial oxidation stage 14. An oxygen feed line 36 also leads into the partial oxidation stage 14. A slag removal line 37 leads from the partial oxidation stage 14.

The partial oxidation stage 14 is connected to the first cooling stage 15 and the water-gas shift reaction stage 16 by means of an upgraded synthesis gas line 38. A steam feed line 40 also leads into the water-gas shift reaction stage 16, to supply additional steam if required.

From the first cooling stage 15, a high pressure steam line 17 and a possible condensate removal line 19 lead.

A hydrogen enriched synthesis gas line 42 connects the water-gas shift reaction stage 16 to the cooling stage 18. From the cooling stage 18, a high pressure steam line 44 and a condensate removal line 46 lead. In addition, the cooling stage 18 is connected to the synthesis gas sweetening stage 20 by means of a cooled synthesis gas line 48.

The synthesis gas sweetening stage 20 is provided with a naphtha removal line 50 and a sulphur removal line 52. A methanol feed line 54 leads into the synthesis gas sweetening stage 20.

The synthesis gas sweetening stage 20 is connected to the synthesis gas conversion stage 22 by a final synthesis gas line 56. An intermediate product line 58 and a reaction water removal line 60 lead from the synthesis gas conversion stage 22.

The $CO_2$ removal stage 24 is connected to the synthesis gas conversion stage 22 by means of a light gas line 62 and to the cold separation stage 26 by means of a $CO_2$ free light gas line 64. From the $CO_2$ removal stage 24, a $CO_2$ line 66 is taken, and from the cold separation stage 26, a condensate line 68 is taken. In addition, a methane-rich line 70 leads from the cold separation stage 26.

Typically, the gasification stage 12 comprises a plurality of moving bed gasifiers, such as Lurgi (trade name) moving bed gasifiers (not shown). These gasifiers produce synthesis gas with a $CO:H_2$ molar ratio between 1:1.7 and 1:2, which makes them ideal for the production of synthesis gas which is to be used in a Fischer-Tropsch hydrocarbon synthesis stage. Coarse coal is fed through a lock hopper (not shown) to the gasifiers as indicated by the coal feedstock line 28, with steam and oxygen being fed along the steam and oxygen feed line 30. Oxygen is required to combust some of the coal to supply energy for the endothermic gasification reactions. Typically, part of the steam that is used is generated in a gasifier jacket from boiler feed water that is fed to the jacket (not shown). The steam is at a pressure of 40 bar(gauge) and a temperature of 390° C., with the boiler feed water being at a pressure of 40 bar(gauge) and a temperature of 105° C. and the oxygen being at a pressure of 29 bar(gauge) and a temperature of 140° C.

In each gasifier, within a gasifier bed, different reaction zones are distinguishable from top to bottom, namely a drying zone where moisture is released, a devolatilization zone where pyrolysis takes place, a reduction zone where mainly the endothermic reactions occur, an exothermic oxidation or combustion zone, and an ash bed at the bottom of the gasifier bed. As a result of the counter current mode of operation, hot ash exchanges heat with cold incoming reagents, such as steam and oxygen or air, while at the same time hot raw gas exchanges heat with cold incoming coal. This results in the ash and raw gas, respectively leaving the gasification stage 12 by means of the ash removal line 32 (after passing through a rotating grate and lock hopper) and the raw gas line 34, at relatively low temperatures compared to other types of gasifiers, which improves the thermal efficiency and lowers the steam and oxygen consumption of the gasifiers.

In the pyrolysis zones of the gasifiers, tars, oils and pitches and the like are released. These pyrolysis products are not destroyed, in view of the lower operating temperatures of the Lurgi (trade name) gasifiers. The pyrolysis products can be used to create valuable co-products such as ammonia, sulphur, cresols and phenol.

The following reactions take place in the gasifier:

| Combustion: | |
|---|---|
| $C + O_2 \rightarrow CO_2$ | $\Delta H = -406$ kJ/mol |
| Reduction: | |
| $C + CO_2 \rightarrow 2CO$ | $\Delta H = 160$ kJ/mol |
| $C + H_2O \rightarrow CO + H_2$ | $\Delta H = 119$ kJ/mol |
| Water-gas shift: | |
| $CO + H_2O \rightarrow CO_2 + H_2$ | $\Delta H = -40$ kJ/mol |
| Methane formation: | |
| $C + 2H_2 \rightarrow CH_4$ | $\Delta H = -87$ kJ/mol |
| $CO + 3H_2 \rightarrow CH_4 + H_2O$ | $\Delta H = -206$ kJ/mol |
| $3C + 2H_2O \rightarrow CH_42CO$ | $\Delta H = 182$ kJ/mol |

The temperature profile in each gasifier varies as the coal moves through the different zones in the gasifier. In the gasification zone the temperature varies between 800° C. and 1200° C. The raw synthesis gas leaving the gasification stage 12 is typically at a temperature of between about 460° C. and 500° C., but may be lower.

The maximum temperature in the gasifiers is limited by the ash fusion temperature of the coal feedstock. Ash fusion creates removal problems of the ash at the bottom of the gasifiers. Owing to this limitation, the temperatures cannot be raised, causing more methane to form part of the raw synthesis gas than would be the case with higher temperatures.

In addition to $H_2$, CO, $CO_2$, $H_2O$ and $CH_4$, the raw synthesis gas fed from the gasification stage 12 to the partial oxidation stage 14 also includes solid particles and tars and contaminants such as $H_2S$.

In the partial oxidation stage 14, the methane is thermally partially oxidised at a temperature of about 1300° C. in a combustion process with the oxygen fed to the partial oxidation stage 14 by means of the oxygen feed line 36. During the partial oxidation reaction, the methane is converted to $H_2$ and CO, thus providing an upgraded synthesis gas which includes less methane and more $H_2$ and CO than the raw synthesis gas fed to the partial oxidation stage 14. The tars and higher hydrocarbons present in the raw synthesis gas are also cracked and combusted rendering the upgraded synthesis gas from the partial oxidation stage 14 free of these troublesome components. The solids are removed as a slag from the partial oxidation stage 14 by means of the line 37.

For the process 10 of the invention, it may be necessary to employ a deposition stage (not shown) where soot particles are deposited on a collecting surface, to separate soot possibly formed in the partial oxidation stage from the upgraded synthesis gas before the upgraded synthesis gas enters the synthesis gas conversion stage.

In the first cooling stage 15, the upgraded synthesis gas is cooled, with high pressure steam at a pressure of about 40 bar(gauge) being generated and removed along line 17. During the cooling/steam generation process, water could be condensed from the upgraded synthesis gas, with the condensate being removed by means of the condensate removal line 19.

In the water-gas shift reaction stage 16, the upgraded synthesis gas may be mixed with high pressure steam at a temperature of about 420° C. if enough water is not present in the upgraded raw gas, with the upgraded synthesis gas being subjected to a water-gas shift reaction to provide a hydrogen-enriched synthesis gas with a more desirable molar ratio of CO and $H_2$ of about 1:1.7. The operating temperature for the water-gas shift reaction must be above 300° C., typically between 700° C. and 900° C. Thus, the hydrogen-enriched synthesis gas from the water-gas shift reaction stage 16 comprises more hydrogen and less CO than the upgraded synthesis gas fed to the water-gas shift reaction stage 16.

In the second cooling stage 18, the hydrogen-enriched synthesis gas is cooled, with high pressure steam at a pressure of about 40 bar(gauge) being generated. During the cooling/steam generation process, water is condensed from the hydrogen-enriched synthesis gas, with the condensate being removed by means of the condensate removal line 46.

The cooled synthesis gas is transferred by means of the cooled synthesis gas line 48 to the synthesis gas sweetening stage 20. The synthesis gas sweetening stage 20 is a so-called Rectisol process intended to remove sulphur compounds, $CO_2$, higher hydrocarbons (naphtha) and HCN from the cooled synthesis gas.

In the synthesis gas sweetening stage 20, the cooled synthesis, gas is further cooled in a series of heat exchangers (not shown) and any entrained gas liquor is removed. Methanol is added to the synthesis gas to prevent icing as the cooled synthesis gas is still saturated with water. The cold synthesis gas is washed with more methanol in a pre-wash section of an absorber (not shown) which includes a pre-wash, a main wash and a fine wash section. In the pre-wash section, naphtha, HCN and water are removed to the bottom of the absorber while the synthesis gas moves up the absorber through the main wash and the fine wash sections. In the main wash and fine wash sections, methanol is used to remove sulphur gases and $CO_2$ from the synthesis gas. The final, cleaned synthesis gas leads from the top of the absorber and is fed to the synthesis gas conversion stage 22 along the final synthesis gas line 56. The sulphur compounds are removed from the synthesis gas sweetening stage 20 by means along the naphtha removal line 50.

The synthesis gas conversion stage 22 makes use of high temperature Fischer-Tropsch conversion. The final synthesis gas is fed along the final synthesis gas line 56 to Fischer-Tropsch reactors where the hydrogen and carbon monoxide in the final synthesis gas react under pressure in the presence of a fluidised, iron-based catalyst at a modest temperature in the region of about 350° C. to yield a broad spectrum of hydrocarbons in the $C_1$–$C_{50}$ range. High value chemical components are produced simultaneously with synthetic oil. Oxygenated hydrocarbons and reaction water are also produced in the reactors.

The final synthesis gas is fed to the bottoms of the Fischer-Tropsch reactors at a rate which fluidises an iron catalyst bed allowing the Fischer-Tropsch reaction to proceed at the temperature of approximately 350° C. and a pressure of 20 bar. As the reaction is exothermic, steam-producing cooling coils (not shown) are present in the Fischer-Tropsch reactors to remove the heat of reaction. Fresh iron catalyst is added when required without disrupting the process to keep the conversion of the synthesis gas high and to ensure that the particle size distribution of the catalyst particles is kept constant, in order to avoid affecting the voidage of the bed and the pressure drop through the bed. Typically, for high temperature fluidised bed Fischer-Tropsch reactors, the spread of products is more or less as shown in the following Table:

TABLE 1

| Component | Mass % of product streams |
|---|---|
| $CH_4$ | 8 |
| $C_2$-$C_4$ | 25 |
| Fuel Range (Petrol, diesel, etc.) | 62 |
| Oxygenates | 5 |

A variety of intermediate product streams, such as a decanted oil stream and a stabilised light oil stream, are removed from the synthesis gas conversion stage 22 for further working up in the refinery. The streams are generically indicated by the intermediate product line 58. Similarly, reaction water is removed from the synthesis gas conversion stage 22 by means of the reaction water removal line 60 for recovery of valuable products such as alcohols, ketones and organic acids.

A light gas product is withdrawn from the synthesis gas conversion stage 22 along the light gas line 62 and passed to the $CO_2$ removal stage 24. The $CO_2$ removal stage 24 is a so-called Benfield separation process which is employed to remove $CO_2$ from the light gas product, which typically comprises $CO_2$, $H_2$ and $CH_4$. As will be appreciated, $CO_2$ is formed in large quantities during Fischer-Tropsch synthesis as a result of the so-called water-gas shift reaction. Typically, the $CO_2$ makes up about 11% of the light gas product withdrawn from the synthesis gas conversion stage 22.

In the $CO_2$ removal stage, the $CO_2$ gas is absorbed from the light gas in two trains using a solution of $K_2CO_3$ and diethanol amine. The light gas passes through a $K_2CO_3$ wash column (not shown) followed by a diethanol amine wash column (not shown). The $K_2CO_3$ solution and the diethanol amine solution are regenerated in two separate regeneration columns (not shown). Typically, the $CO_2$ recovered during regeneration of the $K_2CO_3$ and diethanol amine solutions is released into the atmosphere, as indicated by the $CO_2$ line 66. Alternatively, the $H_2/CO$ ratio of synthesis gas produced can be tailored by recycling $CO_2$ to the thermal partial oxidation stage.

A $CO_2$ free light gas stream from the $CO_2$ removal stage 24 is sent to the cold separation stage 26 by means of the $CO_2$ free light gas line 64. The purpose of the cold separation stage 26 is to separate out the methane, hydrogen, ethylene and propylene from the remaining gases in the $CO_2$ free light gas stream. This is effected by first cooling the $CO_2$ free light gas stream to a temperature of about 15° C. at 27 bar and removing a $C_3$ hydrocarbon fraction and water. Further cooling to −35° C. and drying are effected in a second stage with a condensate stream containing a $C_3$ and $C_2$ fraction being removed for further purification in a de-ethaniser column (not shown). The remainder of the $CO_2$ free light gas stream is cooled again and the hydrogen and methane are separated. The hydrogen is sent to pressure swing absorbers (not shown) for purification. The methane, in the form of a methane condensate, is purified in a de-methaniser column (not shown) and then removed from the cold separation stage 26 as shown by the methane rich line 70. This methane can either be flared, or returned to the partial oxidation stage 14. The various condensate streams removed from the cold separation stage 26 are transferred to the refinery and are generically indicated by the condensate line 68.

The process 10 was simulated mathematically and the following Tables provide some of the salient information generated by the simulation. In the simulation, it was assumed that thirty-seven Lurgi (trade name) gasifiers are employed and that the steam that is generated during the process 10 is also used in the process 10. The Tables also include comparative information for a conventional Lurgi (trade name) conventional process being similar to the process 10 as far as the stages 20, 22, 24 and 26 are concerned. In the conventional process, however, methane from the synthesis conversion stage 22 is reformed in autothermal reformers in the presence of steam and oxygen (at a carbon:steam ratio of 1:1.5) and recycled to join up with the raw synthesis gas from the gasifiers.

TABLE 2

Coal feedstock composition

| Component | Mass % |
| --- | --- |
| Fixed Carbon | 46.03 |
| Ash | 23.67 |
| Volatiles | 22.61 |
| Inherent moisture | 4.18 |
| Tar | 3.50 |

TABLE 3

Synthesis gas composition and condition after various stages of the process 10

| | After gasification stage 12 | After partial oxidation stage 14 | After water-gas shift reaction stage 16 |
| --- | --- | --- | --- |
| Temperature ° C. | 404 | 1300 | 850.00 |
| Pressure bar(g) | 29.00 | 29.00 | 29.00 |
| $H_2O$(mol %) | 34.47 | 29.79 | 35.08 |
| $H_2$(mol %) | 20.74 | 31.89 | 30.71 |
| $CH_4$(mol %) | 10.64 | 0.22 | 0.46 |
| CO(mol %) | 12.20 | 23.63 | 17.82 |
| $CO_2$(mol %) | 21.10 | 13.90 | 15.42 |
| N2(mol %) | 0.60 | 0.57 | 0.51 |
| TAR(mol %) | 0.26 | 0.00 | 0.00 |
| $H_2$/CO ratio | 1.7 | 1.35 | 1.7 |
| Total(kmol/hr) | 3898.00 | 4842.82 | 5424.84 |

TABLE 4

Final synthesis gas fed to synthesis gas conversion stage

| | Composition (mol %) | |
| --- | --- | --- |
| | Conventional process | Process 10 of the invention |
| $H_2O$ | 0.17 | 0.20 |
| $H_2$ | 57.37 | 62.00 |
| Argon | 0.06 | 0.00 |
| $N_2$ | 1.96 | 1.03 |
| CO | 23.70 | 35.98 |
| $CO_2$ | 2.30 | 0.06 |
| $C_1$ | 14.34 | 0.93 |
| Ethylene | 0.01 | 0.00 |
| $C_2$ | 0.06 | 0.00 |
| Propylene | 0.02 | 0.00 |
| Total (kmol/hr) | 115442.80 | 99497.44 |

TABLE 5

Steam and oxygen requirements

| | Conventional process | Process 10 of the invention |
| --- | --- | --- |
| HP steam (kgmol/hr) | 87268.52 | 95941.00 |
| $O_2$ (kgmol/hr) | 15693.54 | 20702.61 |

Although, according to the simulations, the conventional process produces 13.8% more final synthesis gas feed to the synthesis gas conversion stage 22 for the same amount of gasifiers, there is 13% more equipment capacity available for the process 10 of the invention, as less methane is passed through the equipment. For the same equipment sizes downstream of the gasifiers, with the process 10 of the invention, as illustrated, more synthesis gas can be generated, using more gasifiers. Furthermore, for the process 10 of the invention, all the high pressure steam required during the process is generated by the process 10 whereas, for the conventional process, an additional 213 tons per hour coal must be combusted to generate sufficient steam for compression of oxygen and other purposes. The process 10 of the invention, as illustrated, also does no require a methane reformer although it is to be appreciated that, if additional methane, e.g. from natural gas is available, the operation of a methane reformer could be justified.

Figure 2:
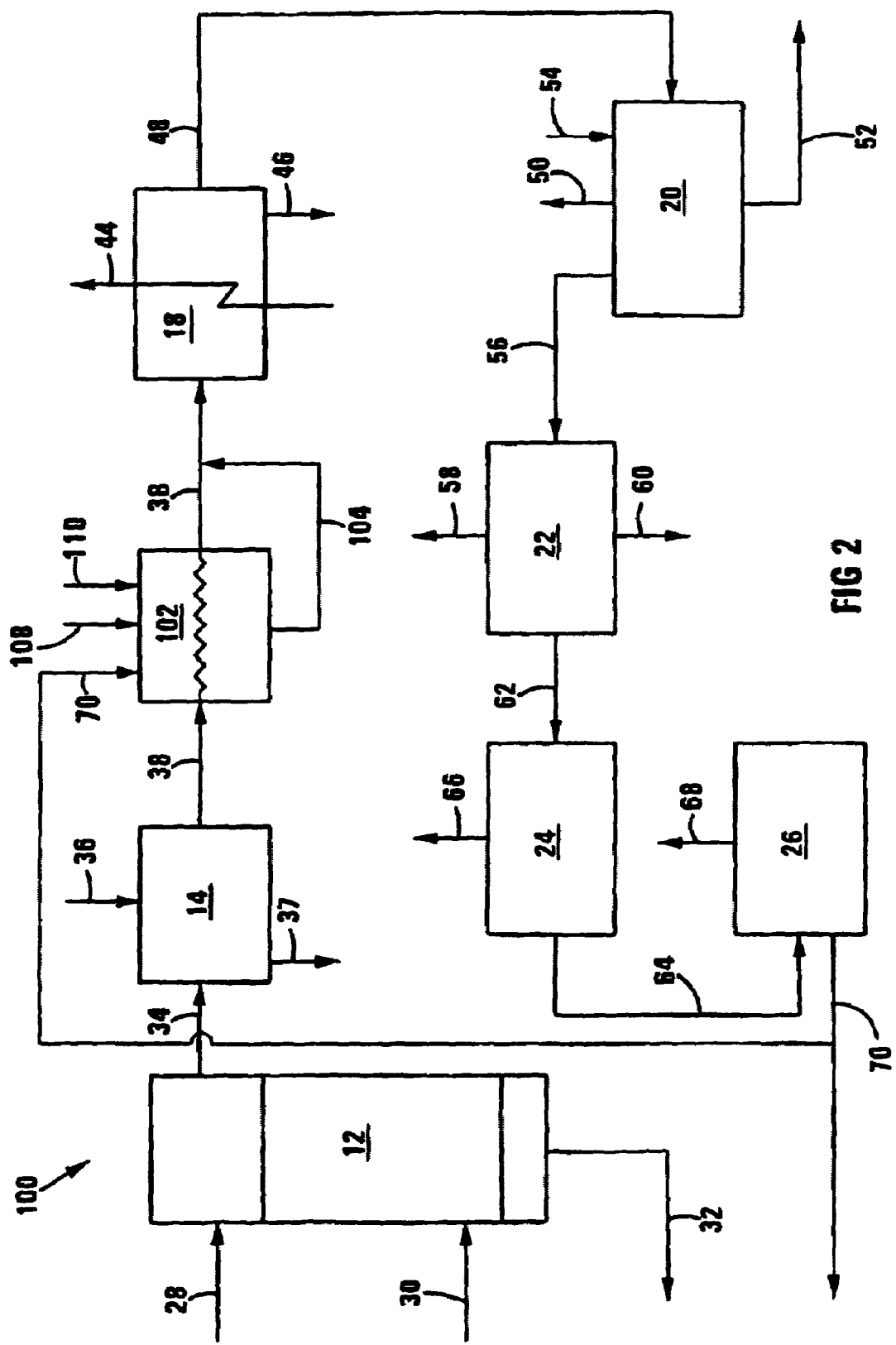
FIG. 2 shows another embodiment of a process in accordance with the invention for producing a synthesis gas derived product, the process including a process for producing synthesis gas.

Referring to FIG. 2 of the drawings, another embodiment of a process in accordance with the invention for producing a synthesis gas derived product, is shown and generally indicated by reference numeral 100. The process 100 is in many respects similar to the process 10 and unless otherwise indicated, the same reference numerals are thus used to indicate the same or similar features.

Instead of the first cooling stage 15 and the water-gas shift reaction stage 16 of the process 10, the process 100 includes a gas heated reforming stage 102. A methane feed line 108, a steam feed line 110 and the methane rich line 70 lead into the gas heated reforming stage 102. A reformed gas line 104 leads from the reforming stage 102 and joins with the upgraded synthesis gas line 38 leading into the cooling stage 18.

As shown in FIG. 2, in the process 100, after gasification and partial oxidation, the upgraded synthesis gas is cooled in the gas heated reforming stage 102 whilst the methane fed into the reforming stage 102 along the lines 108 and 70 is reformed in the presence of steam. The energy for the reforming reaction is thus obtained from the upgraded synthesis gas. Typically, the raw gas from the gasification stage 12 includes sulphur. It is believed that the sulphur present in the raw gas will be beneficial to the reforming step, as sulphur is known to inhibit carbon formation, which results in pit corrosion in gas heated reformers. Thus, in the process 100, it is expected that less expensive materials could be used to construct the gas heated reformer or reformers used in the gas heated reforming stage 102.

As will be appreciated, as a result of the operation of the gas heated reforming stage 102, it is not necessary, in the process 100, to use a water-gas shift reaction stage as the $H_2/CO$ molar ratio in the upgraded synthesis gas in the line 38 leading into the cooling stage 18 is suitable for Fischer-Tropsch hydrocarbon synthesis.

The processes 10, 100 were simulated mathematically and compared to a conventional base case process making use of a Lurgi (trade name) gasification process followed by quenching and cooling of raw synthesis gas. The conventional process is thus similar to the process 10 as far as stages 12, 20, 22, 24 and 26 are concerned. However, in the conventional process, methane from the synthesis gas conversion stage 22 is reformed in autothermal reformers in the presence of steam and oxygen (at a carbon:steam ratio of 1:1.5) and recycled to join up with the raw synthesis gas from the gasifiers. A process in which gasification is followed by partial oxidation and autothermal reforming was also simulated. This process is referred to as "Case 4" hereunder.

In the simulations, for the process 10, it was assumed that the gasifier or gasifiers produce a raw synthesis gas having an $H_2/CO$ molar ratio of 1.7. For the process 100, it was assumed that an $H_2/CO$ molar ratio of 1.9 exists for the combined streams exiting the stage 14 and the stage 102 (total syngas stream). The same assumption was used for Case 4, i.e. an $H_2/CO$ molar ratio of 1.9 in the total syngas stream. Other assumptions include that the partial oxidation stage is operated at a temperature of 1100° C. and that energy is obtained from the partial oxidation of methane and tars. For both the gasifier and the partial oxidation stage, operating pressure is assumed to be 30 bar. All other stages were also assumed to operate at 30 bar. The water-gas shift reaction stage was assumed to operate at 800° C. The gas exiting the partial oxidation stage is cooled to 180° C. during steam generation, or in the gas heated reforming stage 102. In all cases, the high pressure steam is generated at 40 bar at a temperature of 420° C., so that it can be used directly in the process. Boiler feed water is assumed to enter each process at a temperature of 80° C.

The following Tables show the results of the mathematical simulations. In Table 6, stream compositions are given for the process 10 for the raw gas from the gasification stage 12, the upgraded synthesis gas from the partial oxidation stage 14, and the hydrogen enriched synthesis gas from the water gas shift reaction stage 16. Table 7 provides the compositions of total gas streams, i.e. the compositions obtained if the raw gas from the gasification stage 12 (or the upgraded synthesis gas from the partial oxidation stage 14 in the case of the process 100), and the reformed synthesis gas from the gas heated reforming stage 102 or the autothermal reforming stage, as the case may be, are mixed. In the case of reforming, it was assumed that 600 mol/hr methane was imported additionally per gasifier. Table 7 provides the results for the conventional Lurgi gasification process mentioned hereinbefore, the process which includes partial oxidation followed by autothermal reforming (Case 4), and the process 100.

Table 8 provides information on the calculated oxygen and steam used per unit of synthesis gas produced for the three processes mentioned in relation to Table 7.

In the case where gasification, partial oxidation and autothermal reforming were simulated (Case 4), the oxygen consumption rose by 69% per unit of synthesis gas produced compared to the conventional base case gasification process. For this case, the steam consumption rose by 21%, but decreased by 6% if the steam that was generated in the process was taken into account. In the case where gasification, partial oxidation and gas heated reforming were simulated (process 100), the oxygen consumption was 9% lower than conventional base case gasification process, and the steam consumption decreased by 31.5%. When the generated steam was taken into account, the steam consumption per unit of synthesis gas produced decreased by 60%. The simulations predicted that all tars and heavy hydrocarbons were destroyed when partial oxidation was used, so that no black product work-up was necessary. This means that the difficulties surrounding separation of tars and oils from the raw gas from the gasification stage can be avoided. Furthermore, as will be appreciated, more downstream capacity becomes available when methane is reformed earlier in the process.

TABLE 6

Synthesis gas composition and condition after various stages of the process 10

|  | After gasification stage 12 | After partial oxidation stage 14 | After water-gas shift reaction stage 16 |
| --- | --- | --- | --- |
| $H_2O$(mol %) | 54.50 | 39.29 | 39.79 |
| $H_2$(mol %) | 39.55 | 24.67 | 25.88 |
| $CH_4$(mol %) | 8.96 | 0.01 | 0.38 |
| CO(mol %) | 22.86 | 19.74 | 14.95 |
| $CO_2$(mol %) | 27.17 | 15.29 | 18.05 |
| $N_2$(mol %) | 1.47 | 0.99 | 0.94 |
| Tar(mol %) | 0.38 | 0.00 | 0.00 |
| Total flow(mol/h) | 2889.11 | 5174.31 | 5431.81 |
| $H_2$/CO ratio | 1.70 | 1.25 | 1.70 |
| Temperature (° C.) | 450–550 | 1100 | 800–900 |
| Pressure(bar) | 30 | 30 | 30 |

TABLE 7

Stream compositions where raw gas from gasification and reformed gas from reforming operations are mixed (assuming 600 mol/hr of methane imported per gasifier)

|  | Conventional | Case 4 | Process 100 |
|---|---|---|---|
| $H_2O$(mol %) | 33.51 | 46.74 | 29.35 |
| $H_2$(mol %) | 32.29 | 26.57 | 38.58 |
| $CH_4$(mol %) | 0.31 | 0.02 | 0.18 |
| CO(mol %) | 16.86 | 13.96 | 20.29 |
| $CO_2$(mol %) | 15.94 | 11.90 | 10.69 |
| $N_2$(mol %) | 0.86 | 0.81 | 0.90 |
| Tar(mol %) | 0.21 | 0.00 | 0.00 |
| Total flow(mol/h) | 5145.29 | 9255.20 | 7686.45 |
| $H_2$/CO ratio | 1.90 | 1.90 | 1.90 |

TABLE 8

Oxygen and steam use per unit of syngas produced

|  | Conventional | Case 4 | Process 100 |
|---|---|---|---|
| $O_2$/Syngas | 0.19 | 0.32 | 0.17 |
| Steam/Syngas | 1.07 | 1.30 | 0.74 |
| (Steam-Generated steam)/Syngas | 0.90 | 0.85 | 0.37 |

The invention claimed is:

1. A process for producing synthesis gas, the process including in a gasification stage, gasifying a carbonaceous feedstock in the presence of steam and oxygen and at a temperature below an ash fusion temperature of the carbonaceous feedstock to provide a raw synthesis gas which includes at least $H_2$, CO, $CH_4$, higher hydrocarbons, tars and solids;

feeding the raw synthesis gas, including higher hydrocarbons, tars and solids, to a partial oxidation stage; and in the partial oxidation stage, partially oxidising the $CH_4$ to produce CO and $H_2$ and cracking and combusting the tars and higher hydrocarbons by subjecting the raw synthesis gas to partial oxidation in the presence of oxygen thereby to provide an upgraded synthesis gas which is substantially free of heavier hydrocarbons and which includes less $CH_4$ than the raw synthesis gas.

2. The process as claimed in claim 1, in which the raw synthesis gas is subjected to partial oxidation at a temperature above the ash fusion temperature, and in which the solids are thus removed as a molten slag from the partial oxidation stage.

3. The process as claimed in claim 1, in which the partial oxidation stage is a non-catalytic, thermal partial oxidation stage.

4. The process as claimed in claim 3, which the thermal partial oxidation is effected at a temperature of between about 1000° C. and about 1600° C.

5. The process as claimed in claim 1, in which the carbonaceous feedstock is gasified in a moving bed gasifier.

6. The process as claimed in claim 1 which includes subjecting the upgraded synthesis gas to a water-gas shift reaction stage to provide a hydrogen enriched synthesis gas with a more desirable molar ratio of $H_2$ and CO.

7. The process as claimed in claim 6, which includes, in a cooling stage, cooling the upgraded synthesis gas and producing steam at a pressure of at least 34 bar prior to subjecting the upgraded synthesis gas to the water-gas shift reaction stage.

8. The process as claimed in claim 6, which includes, in a cooling stage, cooling the hydrogen enriched synthesis gas and producing steam at a pressure of at least 34 bar.

9. The process as claimed in claim 1, which includes, in a reforming stage, reforming of steam and a methane-containing feedstock and combining a product stream of the reforming stage with the upgraded synthesis gas.

10. The process as claimed in claim 9, in which the reforming stage is a gas-heated reforming stage in which the upgraded synthesis gas is cooled whilst supplying energy to the reforming stage.

11. A process for producing a synthesis gas derived product, which process includes producing a synthesis gas in a process as claimed in claim 1; and in a synthesis gas conversion stage, converting the synthesis gas to a synthesis gas derived product.

12. The process as claimed in claim 11, the synthesis gas conversion stage is a Fischer-Tropsch hydrocarbon synthesis ge.

13. The process as claimed in claim 11, in which in the synthesis gas conversion stage, a product gas is formed which includes $CH_4$, the process further including separating the $CH_4$ from the product gas and recycling the separated $CH_4$ to the partial oxidation stage.

14. The process as claimed in claim 11, in which the process for producing synthesis gas includes, in a reforming stage, reforming of steam and a methane-containing feedstock, the process for producing a synthesis gas derived product including, in the synthesis gas conversion stage, forming a product gas which includes $CH_4$, the process for producing a synthesis gas derived product further including separating the $CH_4$ from the product gas and recycling the $CH_4$ to the reforming stage.

* * * * *

UNITED STATES PATENT AND TRADEMARK OFFICE
CERTIFICATE OF CORRECTION

PATENT NO. : 7,008,967 B2  Page 1 of 1
APPLICATION NO. : 10/533096
DATED : March 7, 2006
INVENTOR(S) : Martin Jokobus Keyser and Margaretha Coertzen It is certified that error appears in the above-identified patent and that said Letters Patent is hereby corrected as shown below:

Column 1, line 41, reads "...methane obviating the need to quench the raw synthesis gas..." and should read -- ...methane, obviating the need to quench the raw synthesis gas... --.

Column 1, line 56, reads "Subjecting the steam at a temperature of at least 400° C., ..." and should read -- Subjecting the upgraded synthesis gas to a water-gas shift reaction stage typically includes adding steam at a temperature of at least 400° C.,... --.

Column 2, lines 36-37, reads "The Fischer-Tropsch hydrocarbon synthesis stage may be provided with any bed reactor. The pressure in the reactor..." and should read -- The Fischer-Tropsch hydrocarbon synthesis stage may be provided with any suitable reactor such as a tubular fixed bed reactor, a slurry bed reactor or an ebullating bed reactor. The pressure in the reactor...--.

Column 3, lines 12-13, reads "The invention will now be described, by way of example, with reference to the ..." and should read -- The invention will now be described, by way of example, with reference to the accompanying diagrammatic drawings in which --.

Column 12, line 1, reads "The process as claimed in claim 3, which the thermal ..." and should read -- The process as claimed in claim 3, in which the thermal ...--.

Column 12, lines 32-34, reads "The process as claimed in claim 11, the synthesis gas conversion stage is a Fischer-Tropsch hydrocarbon synthesis ge." and should read -- The process as claimed in claim 11, in which the synthesis gas conversion stage is a Fischer-Tropsch hydrocarbon stage. --.

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

PATENT NO.         : 7,008,967 B2
APPLICATION NO.    : 10/533096
DATED              : March 7, 2006
INVENTOR(S)        : Martin Jokobus Keyser and Margaretha Coertzen It is certified that error appears in the above-identified patent and that said Letters Patent is hereby corrected as shown below:

Column 1, line 41, reads "...methane obviating the need to quench the raw synthesis gas..." and should read -- ...methane, obviating the need to quench the raw synthesis gas... --.

Column 1, line 56, reads "Subjecting the steam at a temperature of at least 400° C., ..." and should read -- Subjecting the upgraded synthesis gas to a water-gas shift reaction stage typically includes adding steam at a temperature of at least 400° C.,... --.

Column 2, lines 36-37, reads "The Fischer-Tropsch hydrocarbon synthesis stage may be provided with any bed reactor. The pressure in the reactor..." and should read -- The Fischer-Tropsch hydrocarbon synthesis stage may be provided with any suitable reactor such as a tubular fixed bed reactor, a slurry bed reactor or an ebullating bed reactor. The pressure in the reactor...--.

Column 3, lines 12-13, reads "The invention will now be described, by way of example, with reference to the ..." and should read -- The invention will now be described, by way of example, with reference to the accompanying diagrammatic drawings in which --.

Column 12, line 1, reads "The process as claimed in claim 3, which the thermal ..." and should read -- The process as claimed in claim 3, in which the thermal ... --.

Column 12, lines 32-34, reads "The process as claimed in claim 11, the synthesis gas conversion stage is a Fischer-Tropsch hydrocarbon synthesis ge." and should read -- The process as claimed in claim 11, in which the synthesis gas conversion stage is a Fischer-Tropsch hydrocarbon stage. --.

Column 4, line 58, reads "$3C + 2H_2O \rightarrow CH_42CO$ ..." and should read -- $3C+2H_2O \rightarrow CH_4 + 2CO$...--.

Column 5, lines 62- 63, reads "In the synthesis gas sweetening stage 20, the cooled synthesis, gas is further cooled in a series of heat exchangers ..." and should read -- In the synthesis gas sweetening stage 20, the cooled synthesis gas is further cooled in a series of heat exchangers ... --.

Column 6, lines 11-12, reads "...are removed from the synthesis gas sweetening stage 20 by means along the naphtha removal line 50." and should read -- are removed from the synthesis gas sweetening stage 20 by means of the sulphur removal line 52, whilst the naphtha is passed to a refinery (not shown) along the naphtha removal line 50. --.

UNITED STATES PATENT AND TRADEMARK OFFICE
CERTIFICATE OF CORRECTION

PATENT NO. : 7,008,967 B2
APPLICATION NO. : 10/533096
DATED : March 7, 2006
INVENTOR(S) : Martin Jokobus Keyser and Margaretha Coertzen It is certified that error appears in the above-identified patent and that said Letters Patent is hereby corrected as shown below:

Column 7, lines 46-47, reads "...(trade name) conventional process being similar to the process 10 as far as the stages 20, 22, 24 and 26 are ..." and should read -- . . .(trade name) gasification process followed by quenching and cooling of raw synthesis with the conventional process being similar to the process 10 as far as the stages 20,22,24 and 26 are ...--.

Column 8, line 24, reads "Composition (mol %)" and should read -- Composition (mole %) --.

Column 8, line 62, reads.. ."invention, as illustrated, also does no require a methane..." and should read -- ... invention, as illustrated, also does not require a methane...--.

This certificate supersedes Certificate of Correction issued August 22, 2006.

Signed and Sealed this

Second Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,008,967 B2
APPLICATION NO. : 10/533096
DATED : March 7, 2006
INVENTOR(S) : Martin Jokobus Keyser and Margaretha Coertzen It is certified that error appears in the above-identified patent and that said Letters Patent is hereby corrected as shown below:

Column 1, line 41, reads "...methane obviating the need to quench the raw synthesis gas..." and should read -- ...methane, obviating the need to quench the raw synthesis gas... --.

Column 1, line 56, reads "Subjecting the steam at a temperature of at least 400° C., ..." and should read -- Subjecting the upgraded synthesis gas to a water-gas shift reaction stage typically includes adding steam at a temperature of at least 400° C.,... --.

Column 2, lines 36-37, reads "The Fischer-Tropsch hydrocarbon synthesis stage may be provided with any bed reactor. The pressure in the reactor..." and should read -- The Fischer-Tropsch hydrocarbon synthesis stage may be provided with any suitable reactor such as a tubular fixed bed reactor, a slurry bed reactor or an ebullating bed reactor. The pressure in the reactor...--.

Column 3, lines 12-13, reads "The invention will now be described, by way of example, with reference to the ..." and should read -- The invention will now be described, by way of example, with reference to the accompanying diagrammatic drawings in which --.

Column 4, line 58, reads "$3C + 2H_2O \rightarrow CH_42CO$ ..." and should read -- $3C+2H_2O \rightarrow CH_4 + 2CO$...--.

Column 5, lines 62- 63, reads "In the synthesis gas sweetening stage 20, the cooled synthesis, gas is further cooled in a series of heat exchangers ..." and should read -- In the synthesis gas sweetening stage 20, the cooled synthesis gas is further cooled in a series of heat exchangers ... --.

Column 6, lines 11-12, reads "...are removed from the synthesis gas sweetening stage 20 by means along the naphtha removal line 50." and should read -- are removed from the synthesis gas sweetening stage 20 by means of the sulphur removal line 52, whilst the naphtha is passed to a refinery (not shown) along the naphtha removal line 50. --.

Column 7, lines 46-47, reads "...(trade name) conventional process being similar to the process 10 as far as the stages 20, 22, 24 and 26 are ..." and should read -- . . .(trade name) gasification process followed by quenching and cooling of raw synthesis with the conventional process being similar to the process 10 as far as the stages 20,22,24 and 26 are ...--.

Column 8, line 24, reads "Composition (mol %)" and should read -- Composition (mole %) --.

UNITED STATES PATENT AND TRADEMARK OFFICE
CERTIFICATE OF CORRECTION

PATENT NO. : 7,008,967 B2
APPLICATION NO. : 10/533096
DATED : March 7, 2006
INVENTOR(S) : Martin Jokobus Keyser and Margaretha Coertzen It is certified that error appears in the above-identified patent and that said Letters Patent is hereby corrected as shown below:

Column 8, line 62, reads.. ."invention, as illustrated, also does no require a methane..." and should read -- ... invention, as illustrated, also does not require a methane...--.

Column 12, line 1, reads "The process as claimed in claim 3, which the thermal ..." and should read -- The process as claimed in claim 3, in which the thermal ... --.

Column 12, lines 32-34, reads "The process as claimed in claim 11, the synthesis gas conversion stage is a Fischer-Tropsch hydrocarbon synthesis ge." and should read -- The process as claimed in claim 11, in which the synthesis gas conversion stage is a Fischer-Tropsch hydrocarbon stage. --.

This certificate supersedes Certificate of Correction issued August 22, 2006 and January 2, 2007.

Signed and Sealed this

Sixth Day of February, 2007

JON W. DUDAS
*Director of the United States Patent and Trademark Office*